US011137519B2

(12) United States Patent
Ray et al.

(10) Patent No.: US 11,137,519 B2
(45) Date of Patent: Oct. 5, 2021

(54) MULTI-FIBER OPTICAL SENSOR FOR ICING

(71) Applicant: Rosemount Aerospace Inc., Burnsville, MN (US)

(72) Inventors: Mark Ray, Burnsville, MN (US); Kaare Josef Anderson, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 553 days.

(21) Appl. No.: 15/216,398

(22) Filed: Jul. 21, 2016

(65) Prior Publication Data

US 2018/0024270 A1 Jan. 25, 2018

(51) Int. Cl.
*G01W 1/00* (2006.01)
*G01S 7/481* (2006.01)
(Continued)

(52) U.S. Cl.
CPC .......... *G01W 1/00* (2013.01); *G01N 15/0211* (2013.01); *G01S 7/4802* (2013.01); *G01S 7/4815* (2013.01);
(Continued)

(58) Field of Classification Search
CPC ........ B64D 15/20; B64D 15/00; G01N 21/21; G01N 15/0211; G01N 21/51;
(Continued)

(56) References Cited

U.S. PATENT DOCUMENTS 4,150,287 A * 4/1979 Perkins ................ G01N 21/474
250/226
4,327,286 A * 4/1982 Thoma ................... G08B 19/02
250/231.1
(Continued)

FOREIGN PATENT DOCUMENTS

CN          202075225 U    12/2011
WO       2014132074 A2     9/2014

OTHER PUBLICATIONS

Extended European Search Report, for European Patent Application No. 17182528.4, dated Dec. 15, 2017, 9 pages.
(Continued)

*Primary Examiner* — Mohamed K Amara
(74) *Attorney, Agent, or Firm* — Kinney & Lange, P.A.

(57) ABSTRACT

Apparatus and associated methods relate to sampling a large volume of a cloud atmosphere so as to obtain a large signal response from even a sparse distribution of water droplets in the cloud atmosphere. Such a volume can be probed by projecting an uncollimated optical beam into the cloud atmosphere and sampling the signal backscattered from the water droplets located within the probed volume. The uncollimated optical beam can be generated by projecting a diverging pulse of light energy from a polished end of a first optical fiber. A second optical fiber can be used to receive the optical signal backscattered from the cloud atmosphere. The second optical fiber can also have substantially the same field of view as the first optical fiber, so as to receive signals from a volume of the cloud atmosphere that is substantially commensurate with the probed volume.

20 Claims, 7 Drawing Sheets (51) Int. Cl.
  *G01S 17/95* (2006.01)
  *G01S 7/48* (2006.01)
  *G01S 7/499* (2006.01)
  *G01N 15/02* (2006.01)

(52) U.S. Cl.
  CPC ............ *G01S 7/4818* (2013.01); *G01S 7/499* (2013.01); *G01S 17/95* (2013.01); *Y02A 90/10* (2018.01)

(58) Field of Classification Search
  CPC ....... G01N 21/0303; G01N 2015/0026; G01N 21/45; G01N 15/1429; G01N 2201/062; G01N 2015/0222; G01N 2021/4709; G01N 2021/0389; G01N 21/474; G01S 17/95; G01S 7/4802; G01S 7/499; G01S 17/42; G01S 17/87; G08B 19/02; G01J 3/4412; G01J 9/02; G01J 2009/0223; G01J 2003/4418; G01J 3/453; G01B 9/02044; G01B 9/02027; G01B 9/02002; G01B 9/0209; G01B 9/02005; G01B 9/02007; G01B 9/02014
  See application file for complete search history.

(56) References Cited

U.S. PATENT DOCUMENTS

| | | | | |
|---|---|---|---|---|
| 5,014,042 A * | 5/1991 | Michoud | ............... | B64D 15/20 244/134 F |
| 5,398,547 A * | 3/1995 | Gerardi | ............... | B64D 15/20 244/134 F |
| 5,587,785 A * | 12/1996 | Kato | ............... | G01S 17/95 356/28.5 |
| 5,701,181 A * | 12/1997 | Boiarski | ............... | G01N 21/474 250/227.2 |
| 5,748,091 A * | 5/1998 | Kim | ............... | G08B 19/02 244/134 F |
| 5,835,199 A * | 11/1998 | Phillips | ............... | G01S 7/4802 356/5.03 |
| 5,926,262 A * | 7/1999 | Jung | ............... | A61B 5/0088 356/416 |
| 6,010,095 A * | 1/2000 | Hackmeister | ............... | B64D 15/20 244/134 F |
| 6,069,565 A * | 5/2000 | Stern | ............... | B64D 15/20 340/583 |
| 6,091,335 A * | 7/2000 | Breda | ............... | B64D 15/20 244/134 F |
| 6,206,325 B1 * | 3/2001 | Nunnally | ............... | B64D 15/00 244/134 E |
| 6,488,892 B1 * | 12/2002 | Burton | ............... | B01L 9/523 356/244 |
| 6,738,144 B1 * | 5/2004 | Dogariu | ............... | G01N 15/0211 356/335 |
| 6,819,265 B2 * | 11/2004 | Jamieson | ............... | B64D 15/20 340/962 |
| 7,026,600 B2 * | 4/2006 | Jamieson | ............... | G01N 21/251 250/221 |
| 7,104,502 B2 * | 9/2006 | Otto | ............... | B64D 15/20 244/134 F |
| 7,312,713 B2 * | 12/2007 | Alfano | ............... | B64D 15/20 250/339.07 |
| 7,586,419 B2 * | 9/2009 | Ikiades | ............... | B64D 15/20 324/671 |
| 7,652,584 B2 * | 1/2010 | Fridthjof | ............... | B60T 8/172 250/339.11 |
| 7,652,760 B1 * | 1/2010 | Simpson | ............... | G01N 21/8422 356/237.1 |
| 7,986,408 B2 * | 7/2011 | Ray | ............... | B64D 15/20 356/369 |
| 8,701,482 B2 * | 4/2014 | Tsadka | ............... | G01P 5/26 73/170.01 |
| 8,733,164 B2 * | 5/2014 | Olesen | ............... | G01P 13/045 73/170.06 |
| 9,116,243 B1 * | 8/2015 | Brown | ............... | G01S 17/95 |
| 9,180,972 B2 * | 11/2015 | Meis | ............... | B64D 15/20 |
| 9,690,008 B2 * | 6/2017 | Antikainen | ............... | G01S 17/58 |
| 10,031,059 B1 * | 7/2018 | Ray | ............... | G01N 15/0211 |
| 10,207,810 B2 * | 2/2019 | Anderson | ............... | G01S 7/4865 |
| 2002/0075472 A1 * | 6/2002 | Holton | ............... | G01S 7/4818 356/4.01 |
| 2003/0011768 A1 * | 1/2003 | Jung | ............... | A61B 5/0088 356/326 |
| 2004/0231410 A1 * | 11/2004 | Bernard | ............... | B64D 15/20 73/170.26 |
| 2005/0002013 A1 * | 1/2005 | Harris | ............... | G01P 5/26 356/4.1 |
| 2005/0122528 A1 * | 6/2005 | Iwai | ............... | G01J 3/4412 356/479 |
| 2005/0254061 A1 * | 11/2005 | Alphonse | ............... | A61B 5/0066 356/479 |
| 2006/0072118 A1 * | 4/2006 | Chan | ............... | A61B 5/0066 356/495 |
| 2007/0179381 A1 * | 8/2007 | Johansson | ............... | A61B 5/0059 600/476 |
| 2008/0110254 A1 * | 5/2008 | Zhao | ............... | B64D 15/20 73/170.17 |
| 2008/0117419 A1 * | 5/2008 | Hays | ............... | G01N 21/47 356/342 |
| 2011/0019188 A1 * | 1/2011 | Ray | ............... | B64D 15/20 356/342 |
| 2011/0220779 A1 * | 9/2011 | Takaoka | ............... | H01S 5/02284 250/216 |
| 2012/0182544 A1 * | 7/2012 | Asahara | ............... | G01S 7/499 356/73 |
| 2012/0218555 A1 * | 8/2012 | Kumagai | ............... | G01N 21/21 356/461 |
| 2013/0103316 A1 * | 4/2013 | Ray | ............... | G01S 17/95 702/3 |
| 2013/0284856 A1 * | 10/2013 | Botura | ............... | B64D 15/12 244/134 D |
| 2014/0336990 A1 * | 11/2014 | Iwai | ............... | G01N 15/0211 702/189 |
| 2014/0378845 A1 * | 12/2014 | Nadkarni | ............... | A61B 5/0084 600/478 |
| 2015/0051498 A1 * | 2/2015 | Darty | ............... | A61B 5/447 600/477 |
| 2015/0070700 A1 * | 3/2015 | Ray | ............... | G01S 17/95 356/342 |
| 2015/0369733 A1 * | 12/2015 | Izutani | ............... | G01N 21/51 356/338 |
| 2017/0016821 A1 * | 1/2017 | Unlu | ............... | G01N 21/45 |
| 2017/0160148 A1 * | 6/2017 | Saeki | ............... | G01L 1/24 |
| 2017/0229021 A1 * | 8/2017 | Mccann | ............... | G08G 5/006 |

OTHER PUBLICATIONS

European Office Action, for European Patent Application No. 17182528.4, dated Mar. 24, 2020, 6 pages.

* cited by examiner

MULTI-FIBER OPTICAL SENSOR FOR ICING

BACKGROUND

Various cloud conditions can present risks to aircraft when traveling through them. If the temperature of a cloud atmosphere is below the freezing point for water, water droplets can become super-cooled liquid droplets. These super-cooled liquid droplets can then undergo a liquid-to-solid phase change upon impact with an aircraft surface. Ice accretes at different surface regions for different sizes of the super-cooled liquid droplets in the cloud atmosphere. Thus, characterizing the sizes of super-cooled water droplets in a cloud atmosphere can facilitate prediction of surface regions where ice will accrete as well as providing alerts of potentially dangerous conditions to a pilot.

Super-cooled small water droplets tend to form ice only on leading edges of an aircraft's exterior surface. Super-cooled Large water Droplets (SLDs), however, can strike the leading edge of a wing and run back past the icing protection systems, or can traverse airflow vectors and strike surfaces aft of these leading edges. Ice that forms on unprotected surface regions can severely alter the aerodynamics of the aircraft. Such ice accretion may cause aircraft stall or result in unpredictable aircraft control variation that might lead to flight issues. When in a cloud, ice can form on control surfaces and/or lift surfaces.

Not every cloud, however, has a significant SLD population. Different clouds and different atmospheric conditions may be accompanied by various water droplet size distributions, different ice/liquid ratios, etc., some of which may be entirely safe to an aircraft, while others may not be safe. Such water droplet size distributions and ice/liquid ratios may be measured as cloud metrics using various types of instruments.

Some aircraft are equipped with Light Detection and Ranging (LIDAR) systems to measure cloud metrics. Such systems can characterize clouds that have water droplets that have a size distribution having a single mode. Either the mean droplet size or the mode droplet size can be calculated by inversion of a backscatter signal using such systems. These systems can also calculate the density of water droplets for such mono-modal distributions.

Multi-modal distributions of water droplet sizes, however, can be difficult to characterize. Such multi-modal distributions may occur, for example, when cumulus clouds drop drizzle or rain into a lower stratiform cloud deck, creating icing conditions. For droplet size distributions having a dominant mode and a secondary mode (e.g. large distribution of relatively small water droplets plus a small distribution of large water droplets), it can be difficult to detect the anomalous amounts of large water droplets in the secondary mode.

LIDAR systems often project pulses of a collimated laser beam into the cloud atmosphere and then sense the signal backscattered by the cloud atmosphere. The collimated laser beam samples a relatively small volume of the cloud, due to the collimated beam having a small field of view (e.g., 4 mrad of divergence is not atypical). Sampling such a small cloud volume can result in the beam encountering few, if any of the SLDs of a secondary distribution.

Depending on the size and density of the SLDs in the secondary distribution, the backscatter signal can appear as scintillation spikes superimposed on an otherwise smooth continuous range-resolved backscatter signal characteristic of the primary distribution. The size and frequency of occurrence of the scintillation spikes depends on the sizes of the SLDs and on the volume of space probed by the collimated laser beam.

Unlike the smooth range-resolved backscatter signal from the primary distribution, backscatter signals from distributions of large droplet have randomly occurring scintillation pulses. Averaging of such backscatter signals over multiple laser pulses, while boosting the signal-to-noise ratio of the small droplet contribution, can cause the sporadic spikes for the sparse large droplets to be attenuated, and perhaps even fall below a noise floor. Thus, the SLDs, which can be hazardous to aircraft, may not be sensed.

Mono-modal distributions of SLDs can also be problematic, if the density of SLDs is small. Again, the backscatter signal can be characterized by randomly located scintillation spikes. Averaging of such backscatter signals can result in a signal amplitude that is small. Such a small signal may even fall below an instrument noise floor. Measurement techniques and instruments, which can more accurately characterize water droplet distributions, are needed.

SUMMARY

Apparatus and associated devices relate to a system for measuring cloud conditions. The system includes a laser diode configured to generate a pulse of light energy. The system includes a transmitter fiber configured to receive the generated pulse of light energy and to project the received pulse of light energy into a cloud atmosphere. The projected pulse of light energy is projected over a field of view determined by a numerical aperture of a transmission end of the transmitter fiber. The system includes a receiver fiber having a reception end aligned proximate and substantially parallel to the transmission end of the transmitter fiber. The receiver fiber is configured to receive a portion of the transmitted pulse of light energy backscattered by the cloud atmosphere. The system also includes a detector configured to detect the portion of the transmitted pulse of light energy received by the receiver fiber. A numerical aperture of the reception end of the receiver fiber is substantially equal to the numerical aperture of the transmission end of the transmitter fiber.

Some embodiments relate to a method for measuring cloud parameters. The method includes generating a pulse of light energy. The method includes diverging the generated pulse of light energy over a first solid angle greater than a predetermined threshold. The method includes projecting the diverged pulse of light energy into a cloud atmosphere. The projected pulse is projected in a projection direction aligned with a directional axis. The method includes receiving a portion of the projected pulse of light energy backscattered by the cloud atmosphere. The received portion is received over a second solid angle substantially equal to the first solid angle of the diverged pulse. The received portion is received from a reception direction substantially parallel to the directional axis. The method also includes detecting the received portion of the projected pulse of light energy.

DETAILED DESCRIPTION

Apparatus and associated methods relate to sampling a large volume of a cloud atmosphere so as to obtain a large signal response from even a sparse distribution of water droplets in the cloud atmosphere. Such a large volume can be probed by projecting an uncollimated optical beam into the cloud atmosphere and sampling the signal backscattered from the water droplets located within the probed volume. The uncollimated optical beam can be generated by projecting a pulse of light energy from an end of a first optical fiber. The pulse of light energy can be projected from a polished surface of the first optical fiber, for example, without having a lens between the end of the optical fiber and the cloud atmosphere. The unlensed beam can diverge as it projects from the end of the first optical fiber. Various metrics can be used to characterize the divergence of the projected optical beam. For example, angle of divergence (θ), numerical aperture (NA), focal ratio (F/#), and solid angle (Ω) can all be used as metrics characterizing the divergence of the projected optical beam.

Either the first optical fiber or a second optical fiber can be used to receive the optical signal backscattered from the cloud atmosphere. If using a second optical fiber for such purposes, the second optical fiber can be aligned parallel to the first optical fiber so as to be sensitive to optical signals backscattered from the probed volume. The second optical fiber can also have substantially the same field of view as the first optical fiber, so as to receive signals from a volume of the cloud atmosphere that is substantially commensurate with the probed volume. By sampling the large volume of the cloud atmosphere, a continuous range-resolved backscatter signal can be detected, even for clouds having sparse distributions of water droplets.

The fields of view of the first and second optical fibers are substantially equal or substantially the same so that the volume of the cloud atmosphere probed by a signal projecting from the first optical fiber is substantially the same volume from which a backscattered signal is received by the second optical fiber. Two fields of view, and any of the measures of divergence that characterize such fields of view, are substantially equal to one another if they differ by less than ten percent. For example if $2(\theta_2-\theta_1)/(\theta_2+\theta_1)<0.1$ then the two angles of divergence are substantially equal to each other.

Figure 1:
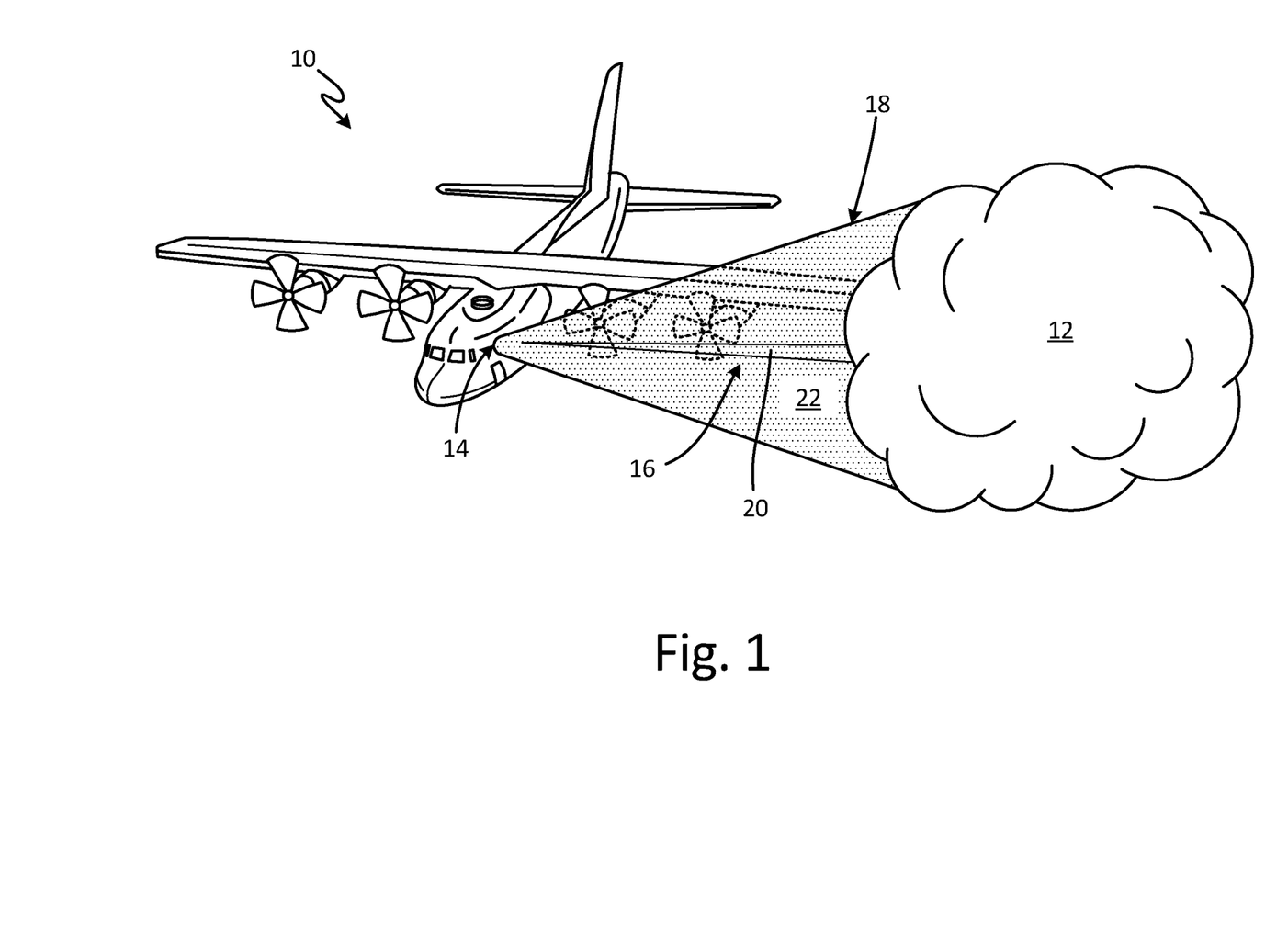
FIG. 1 is a schematic view of an aircraft using an exemplary cloud conditions measurement system to measure various metrics of a cloud in the path of the aircraft.

FIG. 1 is a schematic view of an aircraft using an exemplary cloud conditions measurement system to measure various metrics of a cloud in the path of the aircraft. In FIG. 1, aircraft 10 is traveling through cloud atmosphere 12. Aircraft 10 is equipped with cloud conditions measurement system 14 that is probing cloud atmosphere 12 with collimated optical beam 16 and uncollimated optical beam 18.

Collimated optical beam 16 has a relatively small divergence and probes first probe volume 20. In some embodiments, the divergence of collimated optical beam 16 can be characterized by an angle of divergence of 4 mrad, for example. A cloud atmosphere sampled over a depth of ten meters by such a collimated optical beam results in a first probe volume 20 being equal to about $5\times10^{-3}$ $m^3$.

Uncollimated optical beam 18 has a relatively large divergence and probes second volume 22. In some embodiments, the divergence of uncollimated optical beam 18 can be characterized by a numerical aperture of 0.39, for example. A cloud atmosphere sampled over a depth of ten meters by such an uncollimated optical beam results in second probe volume 22 being equal to about 170 $m^3$. Thus, second probe volume 22 is more than thirty-thousand times larger than first probe volume 20.

Figure 2:
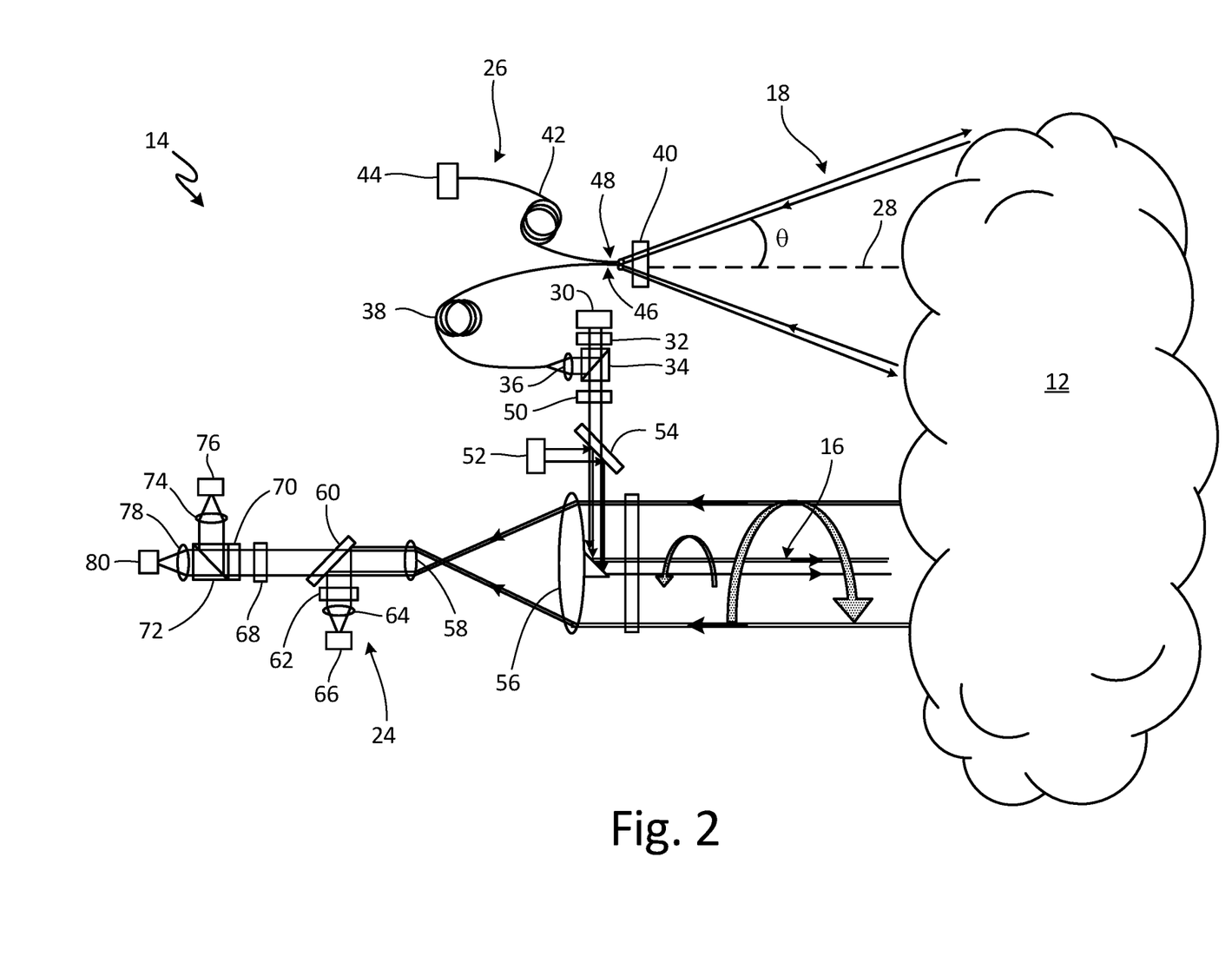
FIG. 2 is a schematic diagram of an embodiment of a cloud conditions measurement system.

FIG. 2 is a schematic diagram of an embodiment of a cloud conditions measurement system. In FIG. 2, cloud conditions measurement system 14 is depicted probing cloud atmosphere 12. Cloud conditions measurement system 14 includes collimated system 24 and uncollimated system 26. Collimated system 24 generates collimated optical beam 16. Uncollimated system 26 generates uncollimated optical beam 18. Uncollimated optical beam 18 can be characterized by directional axis 28 and angle of divergence (θ), for example.

Uncollimated system 26 includes laser diode 30, half-wave plate 32, polarizing beam splitter 34, condenser lens 36, transmitter fiber 38, window polarization scrambler 40, receiver fiber 42, and fiber-coupled detector 44. Laser diode 30 generates a sequence of pulses of optical energy. In some embodiments the wavelength of the optical energy generated by laser diode 30 is about 905 nm, for example. In other embodiments, the wavelength of optical energy generated by laser diode 30 is about 1550 nm, for example. The pulses of optical energy are transmitted through half-wave plate 32, which is rotatable so as to provide a variable polarization of the transmitted optical beam. The polarized optical beam is then split by polarizing beam splitter 34.

Polarizing beam splitter 34 in the beam path of the pulses of optical energy passes P-polarized light, which is used as a source for collimated system 24. The S-polarization is reflected by polarizing beam splitter 34 and coupled into transmitter fiber 38 via condenser lens 36. In this way, half-wave plate 32 permits adjustment of the polarization and hence the relative fraction of laser light entering collimated system 24 and uncollimated system 26.

In some embodiments, transmitter fiber 38 is a multi-modal fiber, for example. Such a multi-modal fiber does not maintain the polarization state of the light entering therein. Thus, light projected from projecting end 46 of transmitter fiber 38 can have multiple polarization contributions. The light is projected through window/polarization scrambler 40, which further suppresses any residual polarization remaining in the projected optical beam. In some embodiments, window-polarization scrambler 40 can be a Cornu polarization scrambler, for example. The light is then projected in the direction of directional axis 28 with an angle of divergence (θ).

In the depicted embodiment, the function of uncollimated system 26 is to measure backscatter and extinction rather than cloud phase (e.g., ice vs. liquid). Collimated system 24 can be used to determine cloud phase, in the depicted embodiment. The signal projected by uncollimated system 26 is then backscattered by cloud atmosphere 12. The signal backscattered by cloud atmosphere 12 is then traverses back through, but in the reverse direction of, window/polarization scrambler 40. The backscattered signal then is collected (e.g., received) by receiver fiber 42, which has a large numerical aperture at reception end 48 of receiver fiber 42 so as to receive light backscattered from substantially the same volume as was probed by the projecting beam.

Receiver fiber 42 is oriented substantially parallel to directional axis 28. Receiver fibers are substantially parallel with transmitter fibers if their axes are aligned within ten degrees of one another. Light received by receiver fiber 42 has an angle of convergence substantially equal to the angle of divergence (θ) associated with transmitter fiber 38.

Receiver fiber 42 then directs the received beam to fiber-coupled detector 44. Fiber-coupled detector 44 is capable of range-resolved measurements. Measurements can be deemed range-resolved if the frequency response of fiber-coupled detector 44 is sufficient to distinguish signals backscattered from various ranges (e.g., various distances from uncollimated system 26) within the probed volume. The backscattered signal detected by fiber-coupled detector 44 can then be modeled and then the backscatter and extinction coefficients can be derived by inversion methods. The backscatter and extinction coefficients can then be used to determine sizes of droplets in cloud atmosphere 12.

Collimated system 24 includes quarter-wave plate 50, laser diode 52 dichroic filter 54, objective lens with turning mirror 56, collimator lens 58, dichroic filter 60, bandpass filter 62, condenser lenses 64, 74, 78 optical detectors 66, 76, 80 bandpass filter 68, quarter-wave plate 70, and polarizing beam splitter 72. Collimated system 24 probes cloud atmosphere 12 using collimated beams of optical energy of two dissimilar wavelengths. Using two dissimilar wavelengths of optical energy can provide information used to determine liquid water content of cloud atmosphere 12.

Laser diode 30 and laser diode 52 generate pulses of optical energy of dissimilar wavelengths. For example, laser diode 30 might generate pulses of optical energy having a first wavelength that corresponds to light having a relatively low water absorption coefficient. For example, various embodiments may have the first wavelength corresponding to light having a water absorption coefficient of less than 100 $m^{-1}$, less than 30 $m^{-1}$, or less than 10 $m^{-1}$. In an exemplary embodiment, the first wavelength may be about 905 nm. In such an embodiment, laser diode 52 might be selected so as to generate pulses of optical energy having a second wavelength that corresponds to light having a relatively high water absorption coefficient. For example, various embodiments may have the second wavelength may be about 1550 nm.

The P-polarized portion of the pulses of optical energy generated by laser diode 30 that pass through polarizing beam splitter 34 are circularly polarized by quarter-wave plate 50. Dichroic filter 54 passes light having first wavelength, as is generated by laser diode 30, but reflects light of second wavelength, as is generated by laser diode 52. Thus, the circularly polarized beam of the first wavelength passes through dichroic filter 54 and is then reflected by turning mirror 56. Turning mirror 56 thus directs circularly polarized collimated beam, which has the first wavelength, in a direction parallel to directional axis 28 and into cloud atmosphere 12.

A second collimated beam having the second wavelength is generated by laser diode 52, reflected by both dichroic filter 54 and turning mirror 56. The second collimated beam is also directed parallel to directional axis 28 and into cloud atmosphere 12. Each of the first and second collimated beams is then backscattered by cloud atmosphere 12. The first collimated beam can be used to determine an ice/liquid phase ratio of cloud atmosphere 12.

An ice/liquid phase ratio of the water droplets in a cloud can be determined, as disclosed by Ray et al. in U.S. Pat. No. 7,986,408, filed Nov. 5, 2008, titled "Apparatus and Method for In-Flight Detection of Airborne Water Droplets and Ice Crystals," the entire disclosure (henceforth referred to as "the '408 patent") of which is hereby incorporated by reference. The '408 patent discloses:

Water droplets ideally act like perfect mirrors and scatter the reflected laser light back on itself without altering the polarization state. If the incident light is horizontally or vertically polarized, the reflected light is likewise horizontally or vertically polarized. Therefore, a backscatter polarization with a relatively low degree of depolarization is indicative of a liquid water cloud. In the case of circular polarization, the direction of the rotating electric field does not change upon reflection, but the change in Poynting vector of the incident wave changes the sense of circular polarization. Hence, an incident beam which is right hand circularly polarized becomes left hand circularly polarized upon reflection, and vice versa.

Ice crystals, on the other hand, tend to alter the polarization state of reflected light, due in part to multiple internal reflections from their facets and in part to the birefringence of ice. Reflected light from airborne ice crystals becomes a mixture of two orthogonal polarization states when the incident light is a pure polarization state. By monitoring both orthogonal polarization states of the backscattered light, it is possible to distinguish water droplets from ice crystals. (Paragraphs [0025, 0026])

Thus, a first optical signal that results from backscattering of the first collimated beam of circularly polarized light will include a component that is left-hand circularly polarized, and a component that is right-hand circularly polarized. Each of these components of the backscattered optical signal is focused by objective lens 56 and collimator lens 58. This focused backscattered optical signal then passes through dichroic filter 60, and bandpass filter 68. Circularly polarized components of this backscattered optical signal are then converted to orthogonal planar polarized (e.g., S-polarized and P-polarized) components via quarter-wave plate 70. Polarizing beam splitter 72 directs the planar polarized component corresponding to right-hand circularly polarized light to optical detector 80 via condenser lens 78. Polarizing beam splitter 72 directs the planar component corresponding to left-hand circularly polarized light to optical detector 76 via condenser lens 74.

Thus, a ratio of the magnitudes of left-hand circularly polarized light and right-hand circularly polarized light can be calculated based on amplitudes of the detected corresponding planar polarized components. This ratio can be used to calculate an ice/liquid phase ratio of cloud atmosphere 12.

A second optical signal resulting from backscattering of the second collimated beam will similarly be focused by objective lens 56 and collimator lens 58. The second backscatter signal will then be reflected by dichroic lens 60. The reflected second backscattered signal will be filtered by bandpass filter 62. The filtered backscattered second backscattered signal will be focused onto optical detector 66 by condenser lens 64. The magnitudes of optical signals detected by detectors 66, 76, 80 can be used to calculate many cloud metrics, including, for example, droplet size, total water content, ice/liquid phase ratio, etc.

Figure 3:
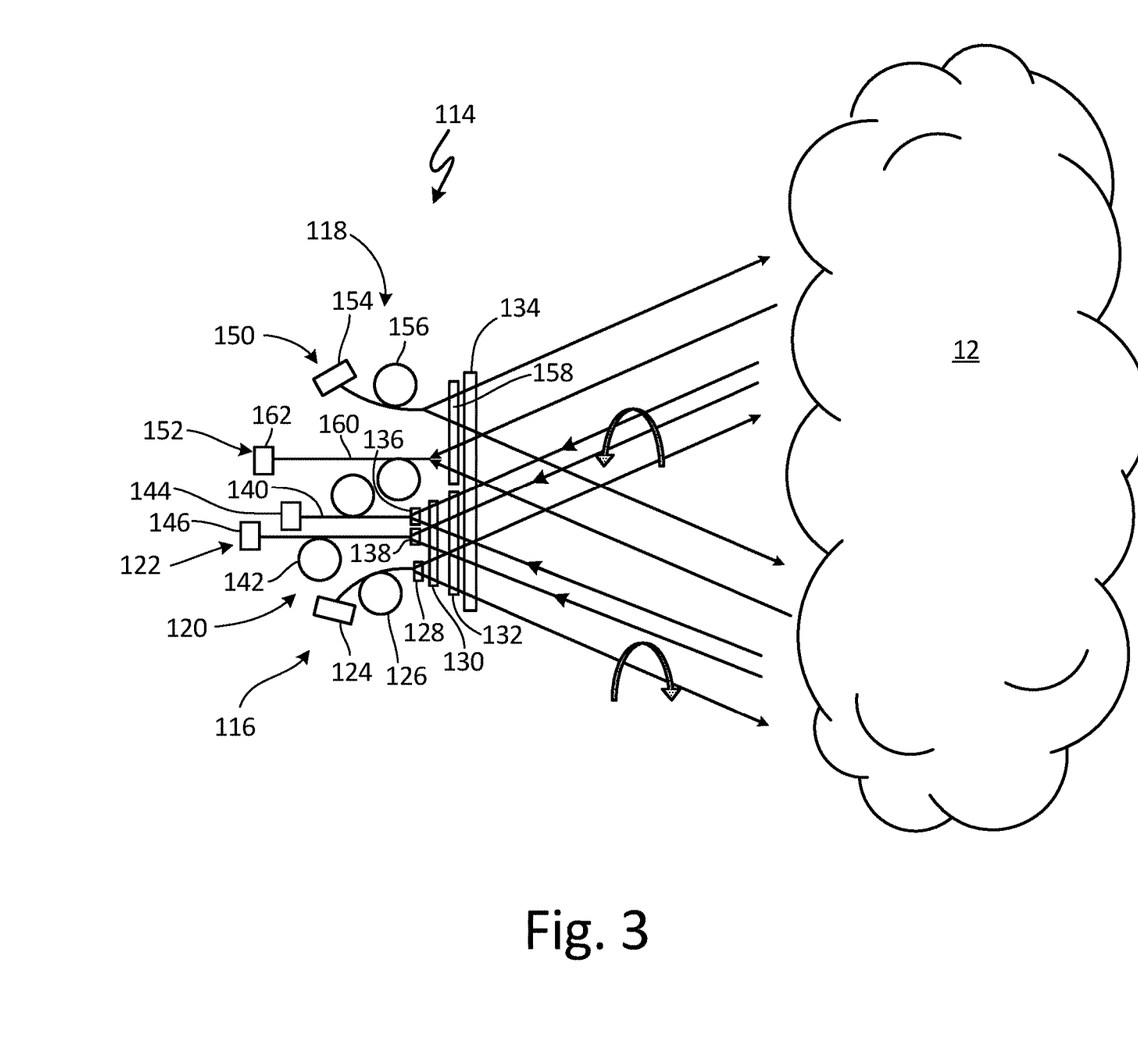
FIG. 3 is a schematic diagram of another embodiment of a cloud conditions measurement system.

FIG. 3 is a schematic diagram of another embodiment of a cloud conditions measurement system. In FIG. 3, cloud conditions measurement system 114 is shown probing cloud atmosphere 12. Cloud conditions measurement system 114 includes only uncollimated systems 116, 118. First uncollimated system 116 includes first optical transmitter 120 and first optical receiver 122. First optical transmitter 120 includes fiber-coupled laser 124, transmitter fiber 126, linear polarizer 128, quarter-wave plate 130, bandpass filter 132, and window 134.

Fiber-coupled laser 124 generates pulses of optical energy having first wavelength. Transmitter fiber 126 transmits these pulses of optical energy to a projecting end of transmitter fiber 126. These pulses of optical energy diverge from the projecting end of the transmitter fiber so as to become an uncollimated beam. The uncollimated beam then projects from transmitter fiber 126 to probe cloud atmosphere 12 via transmission through linear polarizer 128, quarter-wave plate 130, bandpass filter 132, and window 134. These elements 128, 130, 132, 134, through which the uncollimated beam transmits, cause the uncollimated beam to be circularly polarized.

Cloud atmosphere 12 then backscatters the uncollimated beam that probes the cloud atmosphere. The backscattered signal then is transmitted back through window 134, bandpass filter 132 and quarter-wave plate 130 in reverse order that the probing beam transmitted therethrough. These elements 134, 132, 130, through which the backscattered signal transmits, cause the backscattered signal to have orthogonal planar polarized components.

First optical receiver 122 includes linear polarizers 136, 138 receiver fibers 140, 142, and optical detectors 144, 146. Linear polarizers 136, 138 are configured in orthogonal directions, one to another, so as to each permit transmission of components corresponding to backscattered signals that are circularly polarized in opposite directions (e.g., left-hand circularly polarized and right-hand circularly polarized). Receiver fibers 140, 142 are oriented substantially parallel to and transmitter fiber 126, and receiver fibers 140, 142 have a field of view commensurate with (e.g., substantially equal to) the field of view corresponding to transmitter fiber 126, so as to receive backscattered signals from the volume of cloud atmosphere 12 that is probed by the uncollimated beam projected from transmitter fiber 126.

Second uncollimated system 148 includes second optical transmitter 150 and second optical receiver 152. Second uncollimated system 148 is similar to first uncollimated system 116, except that polarization filters are not used. Another difference is that second uncollimated system 148 generates and detects signals of a second wavelength, different from the first wavelength used in first uncollimated system 116. Cloud conditions measurement system 114 depicted in FIG. 3 differs from cloud conditions measurement system 14 depicted in FIG. 2, in that only uncollimated beams are used for the probing cloud atmosphere 12 in the FIG. 3 embodiment.

Second optical transmitter 150 includes fiber-coupled laser 154, transmitter fiber 156 and window 134. Fiber-coupled laser 154 generates pulses of optical energy having the second wavelength. Transmitter fiber 156 transmits these pulses of optical energy to a projecting end of transmitter fiber 156. These pulses of optical energy diverge from the projecting end of the transmitter fiber so as to become an uncollimated beam. The uncollimated beam then projects from transmitter fiber 156 to probe cloud atmosphere 12 via transmission through window 134.

Cloud atmosphere 12 then backscatters the uncollimated beam that probes cloud atmosphere 12. The backscattered signal then transmits through window 134, bandpass filter 158. Second optical receiver 152 includes receiver fiber 160, and optical detector 162. Receiver fiber 160 has a field of view commensurate with the field of view corresponding to transmitter fiber 156, so as to receive backscattered signals from the volume of cloud atmosphere 12 that is probed by the uncollimated beam projected from transmitter fiber 156.

Figure 4:
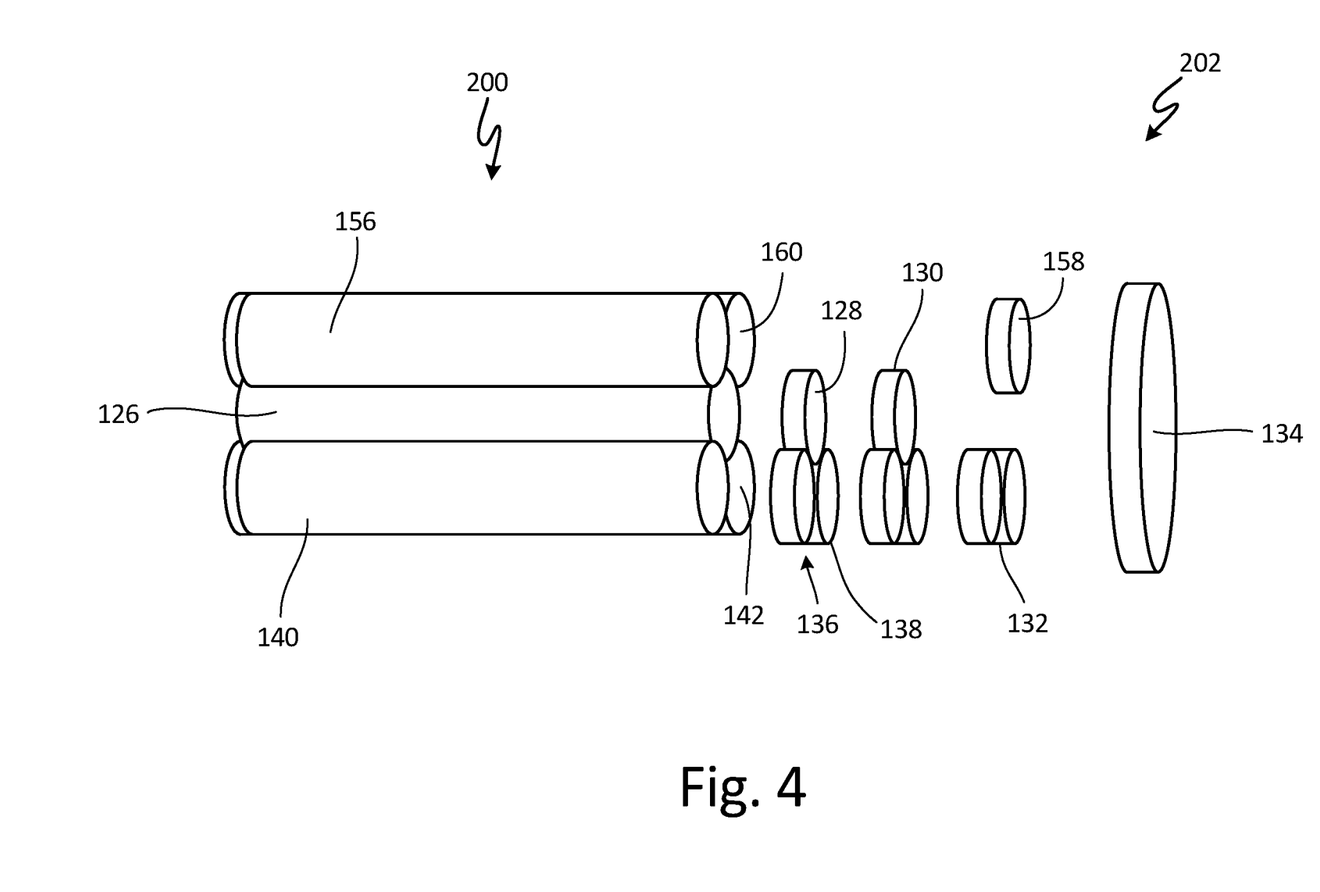
FIG. 4 is a schematic diagram of an exemplary fiber bundle for use in a cloud conditions measurement system, such as that depicted in FIG. 3.

FIG. 4 is a schematic diagram of an exemplary fiber bundle for use in a cloud conditions measurement system, such as that depicted in FIG. 3. In FIG. 4, fiber bundle 200 includes: optical fibers 126, 140, 142, 156, 160; linear polarizers 128, 136, 138; quarter wave plates 130; bandpass filters 132, 158; and window 134. Fiber bundle 200 depicts an exemplary embodiment of a portion of cloud conditions measurement system 114 depicted in FIG. 3. The depicted configuration of optical elements shows transmitter fibers 126, 156 bundled with receiver fibers 140, 142, 160. Transmitter fibers 126, 156 are adjacent to and aligned parallel to receiver fibers 140, 142, 160. Such a configuration facilitates the alignment of receiver fibers 140, 142 to corresponding transmitter fiber 126 and facilitates alignment of receiver fiber 160 to corresponding transmitter fiber 156.

The depicted arrangement of optical elements in FIG. 4 also depicts transmitter fibers 126, 156 that have substantially the same diameter as receiver fibers 140, 142, 160. Such similarly sized fibers can provide similar fields of view for transmitter fibers 126, 156 and receiver fibers 140, 142, 160. Another advantage of the depicted configuration is that the resulting size of fiber bundle 200 is small, because of the compact arrangement of elements. One can direct transmitter fibers 126, 156 and the receiver fibers 140, 142, 160 in a desired direction by bending the bundle of fibers 126, 140, 142, 156, 160 such that a projecting/receiving end 202 of fiber bundle 200 is oriented such that window 134 is has a normal vector directed in the desired direction for probing a cloud atmosphere.

Figure 5:
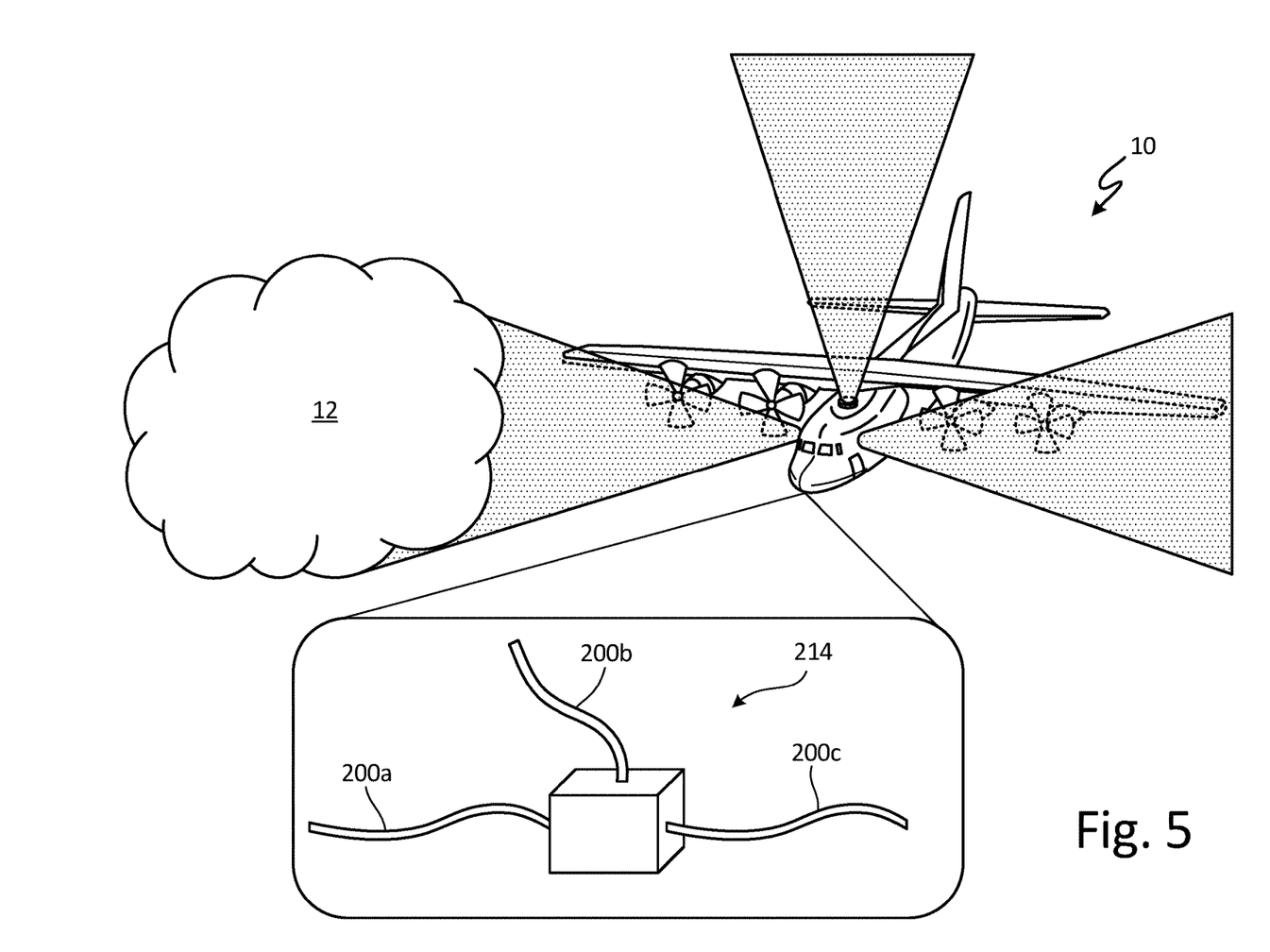
FIG. 5 is a schematic diagram of a multiple-direction cloud conditions measurement system.

FIG. 5 is a schematic diagram of a multiple-direction cloud conditions measurement system. In FIG. 5, aircraft 10 is equipped with multiple-direction cloud conditions measurement system 214. Multiple-direction cloud conditions measurement system 214 includes three fiber bundles 200a, 200b, 200c. Each of fiber bundles 200a, 200b, 200c can be directed in different directions relative to aircraft 10. Each of fiber bundles 200a, 200b, 200c can transmit pulses of optical energy for probing cloud atmosphere 12 to and from optical transmitters and optical receivers, respectively. In some embodiments all three fiber bundles 200a, 200b, 200c can provide transmissions of optical signals simultaneously. In other embodiments, transmission of optical signals can be conducted sequentially in fiber bundles 200a, 200b, 200c.

Figure 6:
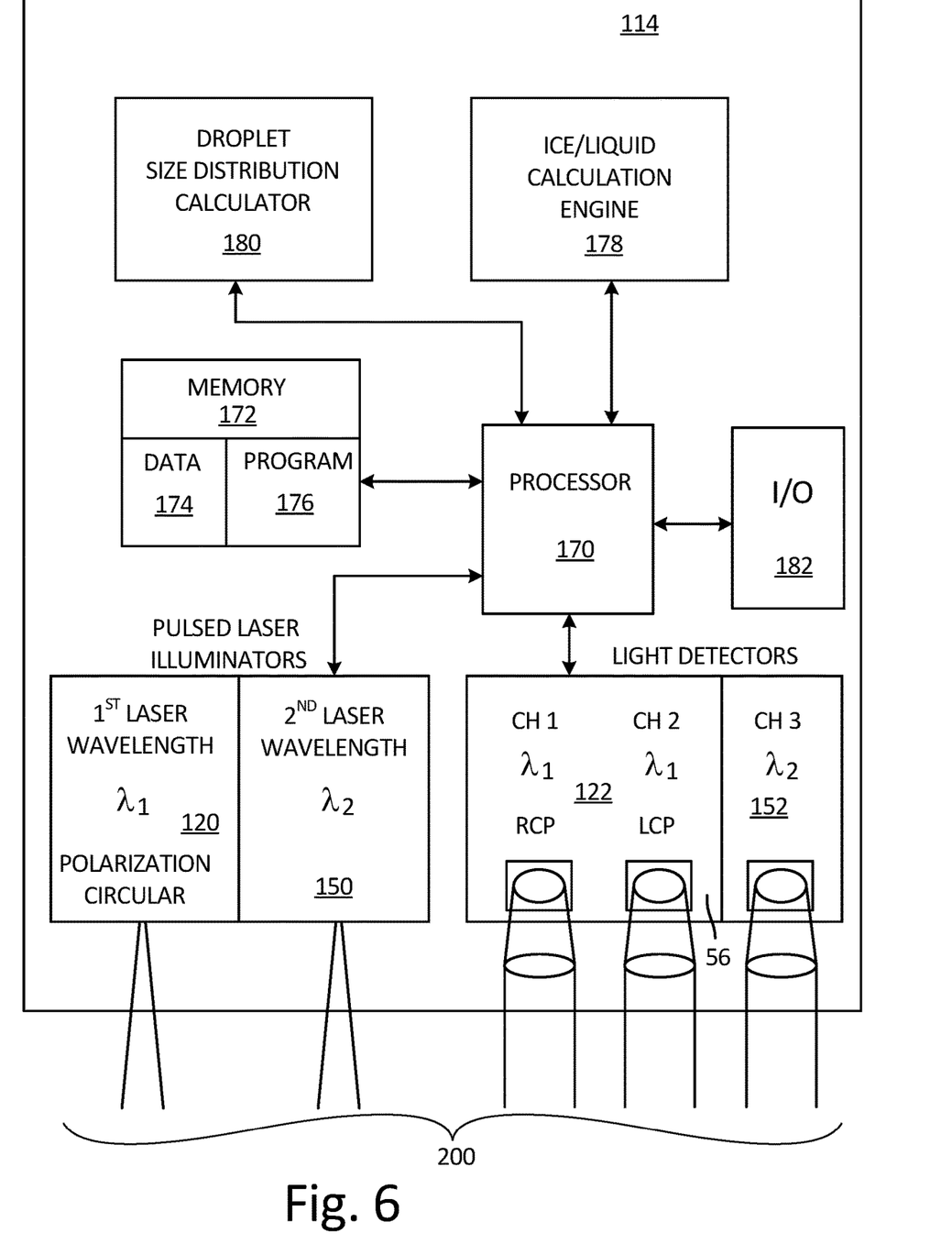
FIG. 6 is a block diagram of an exemplary cloud conditions metric calculator.

FIG. 6 is a block diagram of an exemplary cloud conditions metric calculator. In FIG. 6, optical cloud conditions metric calculator 114 includes: optical transmitter 120, 150; optical receivers 122, 152; processor 170; memory 172 having data memory locations 174 and program memory locations 176; cloud metrics calculation engine 178; droplet size distribution calculator 180; and input/output interface 182. Each of the two optical transmitters 120, 150 generates laser pulses of a specified wavelength and directs the generated pulses to a cloud atmosphere via optical bundle 200. Each of the two optical receives 150, 152 is then configured to receive light corresponding to one of the generated pulses and backscattered from the cloud atmosphere.

Processor 170 then receives backscattered signals from the optical receivers 122, 152. Processor 170 then calculates model parameters based on the received backscattered signals. Processor 170 communicates with data memory locations 174 and program memory locations 176 of memory 172. Processor 170 communicates calculated model parameters to each of droplet size distribution calculator 180 and ice/liquid phase calculation engine 178. Droplet size distribution calculator 180 calculates, based on the calculated model parameters, a size distribution of water particles in the cloud atmosphere. Droplet size distribution calculator 180 then communicates the calculated droplet size distribution to Processor 170. In some embodiments, droplet size distribution calculation is performed by Processor 170.

Ice/liquid phase calculation engine 178 calculates, based on the calculated model parameters, an ice/liquid ratio of water particles in the cloud formation. Ice/liquid phase calculation engine 178 then communicates the calculated ice/liquid ratio to Processor 170. In some embodiments, calculation of an ice/liquid ratio is performed by Processor 170. Processor 170 in turn communicates both calculated droplet size distribution and ice/water ratio to a remote system via input/output interface 182. An exemplary remote system can be a cloud parameter indicator located in a cockpit of an aircraft.

Processor 170, in one example, is configured to implement functionality and/or process instructions for execution within cloud conditions metric calculator 114. For instance, processor(s) 50 can be capable of processing instructions stored in storage device(s) 56. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuitry.

Memory 172 can be configured to store information within cloud conditions metric calculator 114 during operation. Memory 172, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 172 is a temporary memory, meaning that a primary purpose of memory 172 is not long-term storage. Memory 172, in some examples, is described as volatile memory, meaning that memory 172 do not maintain stored contents when power to cloud conditions metric calculator 114 is turned off. Examples of volatile memories can include random access memories (RAM), dynamic random access memories (DRAM), static random access memories (SRAM), and other forms of volatile memories. In some examples, memory 172 is used to store program instructions for execution by processor 170. Memory 172, in one example, is used by software or applications running on cloud conditions metric calculator 114 (e.g., a software program implementing calculations of cloud conditions metrics) to temporarily store information during program execution.

In some examples, memory 172 can also include one or more computer-readable storage media. Memory 172 can be configured to store larger amounts of information than volatile memory. Memory 172 can further be configured for long-term storage of information. In some examples, memory 172 includes non-volatile storage elements. Examples of such non-volatile storage elements can include magnetic hard discs, optical discs, flash memories, or forms of electrically programmable memories (EPROM) or electrically erasable and programmable (EEPROM) memories.

Input/output interface 182 can be used to communicate information between cloud conditions metric calculator 114 and an aircraft. In some embodiments, such information can include aircraft conditions, flying conditions, and/or atmospheric conditions. In some embodiments, such information can include data processed by cloud conditions metric calculator 114, such as, for example, alert signals. Input/output interface 182 can also include a communications module. Input/output interface 182, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Figure 7:
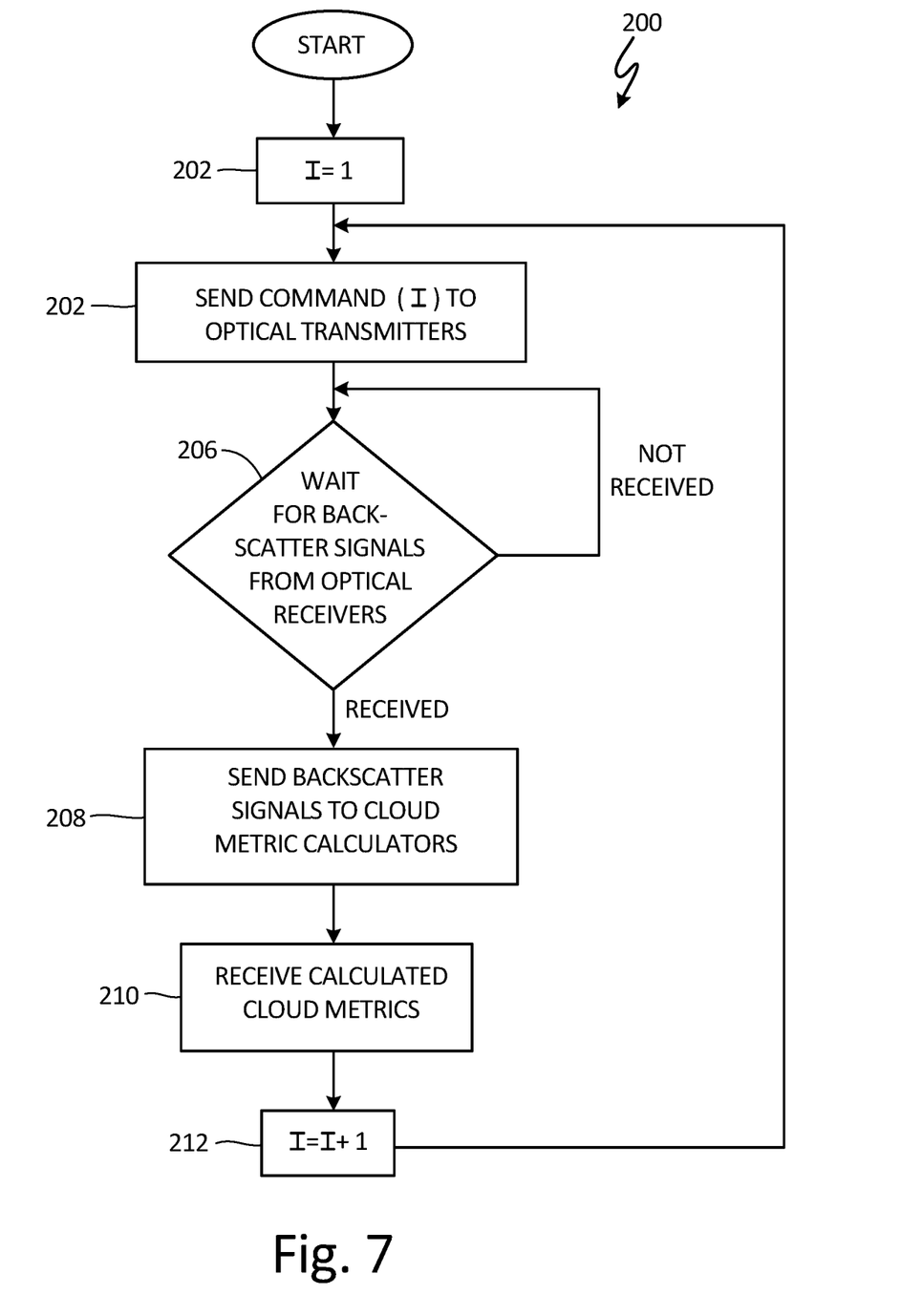
FIG. 7 is a flow chart of an exemplary method for measuring cloud conditions.

FIG. 7 is a flow chart of an exemplary method for measuring cloud conditions. In FIG. 7, method 200 is depicted from the perspective of processor 170 (shown in FIG. 6). Method 200 begins at step 202 where processor 170 initializes index I. Then, at step 204, processor 170 sends a command signal to optical transmitters 120, 150 to generate a pulse of light energy. In response to the command signal, first optical transmitter 120 generates a first pulse of optical energy having a first wavelength, and second optical transmitter 150 generates a second pulse of optical energy having a second wavelength different from the first wavelength. Each of the first and second pulses of optical energy is then transmitted to fiber bundle 200. A first transmitter fiber transmits the first pulse of optical energy from first optical transmitter 120 and projects the pulse of optical energy into a cloud atmosphere external to the aircraft. A second transmitter fiber transmits the second pulse of optical energy from second optical transmitter 150 and projects the pulse of optical energy into the cloud atmosphere external to the aircraft. Each of the first and second pulses of optical energy are projected into the cloud atmosphere in an uncollimated fashion, such that these projected pulsed of optical energy diverge.

At step 206, processor 170 waits to receive backscatter signals from optical receivers 122, 152. When processor 170 receives backscatter signals corresponding to right-hand circularly polarized light and left-hand circularly polarized light from optical receiver 122 as well as a backscatter signal from optical receiver 152, method 200 proceeds to step 208. The received backscatter signals are received by receiver fibers that have a field of view commensurate with the field of view of the transmitter fibers. The backscatter signals are then transmitted from a receiving end of the receiver fibers to optical receivers 122, 152. When backscatter signals are received by optical receivers 122, 152, optical detectors detect the received signals and provide the detected received signals to processor 170. At step 208, processor 170 sends the received backscatter signals to droplet size distribution calculator 180 and to ice/liquid phase calculation engine 178.

Then, at step 210, processor receives calculated cloud metrics from droplet size distribution calculator 180 and ice/liquid phase calculation engine 178. At step 212, processor 170 generates a communication signal, based on the received calculated cloud metrics, and sends the communication signal to a pilot via input/output interface 182. Then, at step 212, processor 170 increments index I, and method 200 returns to step 204, where processor 170 sends another command signal to optical transmitters 120, 150 to generate new pulses of light energy.

The following are non-exclusive descriptions of possible embodiments of the present invention.

A system for measuring cloud conditions includes a laser diode configured to generate a pulse of light energy. The system includes a transmitter fiber configured to receive the generated pulse of light energy and to project the received pulse of light energy into a cloud atmosphere. The projected pulse of light energy is projected over a field of view determined by a numerical aperture of a transmission end of the transmitter fiber. The system includes a receiver fiber having a reception end aligned proximate and substantially parallel to the transmission end of the transmitter fiber. The receiver fiber is configured to receive a portion of the transmitted pulse of light energy backscattered by the cloud atmosphere. The system also includes a detector configured to detect the portion of the transmitted pulse of light energy received by the receiver fiber. A numerical aperture of the reception end of the receiver fiber is substantially equal to the numerical aperture of the transmission end of the transmitter fiber.

The system of the preceding paragraph can optionally include, additionally and/or alternatively, any one or more of the following features, configurations and/or additional components: a processor; a second laser diode; a second detector; a second transmitter fiber; a second receiver; a third receiver fiber; a third detector; and/or a circular polarizing element.

The processor can be configured to calculate a super-cooled large droplet size based on the detected portion of the transmitted light energy received by the receiver fiber.

In some embodiments, the laser diode is a first laser diode, the pulse of light energy is a first pulse of light energy of a first wavelength, the transmitter fiber is a first transmitter fiber, the receiver fiber is a first receiver fiber, and the detector is a first detector. The second laser diode can be configured to generate a second pulse of light energy of a second wavelength different from the first wavelength. The second detector can be configured to detect the portion of the second pulse of light energy backscattered by the cloud atmosphere.

The second transmitter fiber can be configured to receive the generated second pulse of light energy and to project the received second pulse of light energy into a cloud atmosphere. The projected second pulse of light energy can be projected over a field of view determined by a numerical aperture of a second transmission end of the second transmitter fiber.

The second receiver fiber can have a reception end aligned proximate and substantially parallel to the transmission end of the second transmitter fiber. The second receiver fiber can be configured to receive a portion of the transmitted second pulse of light energy backscattered by the cloud atmosphere. A numerical aperture of the reception end of the second receiver fiber can be substantially equal to the numerical aperture of the transmission end of the second transmitter fiber.

The third receiver fiber can have a reception end aligned proximate and substantially parallel to the transmission end of the second transmitter fiber. The third receiver fiber can be configured to receive a portion of the transmitted second pulse of light energy backscattered by the cloud atmosphere.

The third detector can be configured to detect the portion of the transmitted second pulse of light energy received by the receiver fiber. A numerical aperture of the reception end of the third receiver fiber can be substantially equal to the numerical aperture of the transmission end of the second transmitter fiber.

The circular polarizing element can be configured to circularly polarize the second pulse of light energy. The second and third detectors can be configured to detect circularly polarized light energy of opposite polarization directions.

A further embodiment of any of the foregoing systems, wherein the numerical apertures of the transmission end of the transmitter fiber and the reception end of the receiving fiber can be greater than a predetermined threshold. In some embodiments, the predetermined threshold can be 0.25, 0.3, or 0.35, for example. A further embodiment of any of the foregoing systems, wherein the second pulse of light energy is a collimated beam.

A method for measuring cloud parameters includes generating a pulse of light energy. The method includes diverging the generated pulse of light energy over a first solid angle greater than a predetermined threshold. The method includes projecting the diverged pulse of light energy into a cloud atmosphere. The projected pulse is projected in a projection direction aligned with a directional axis. The method includes receiving a portion of the projected pulse of light energy backscattered by the cloud atmosphere. The received portion is received over a second solid angle substantially equal to the first solid angle of the diverged pulse. The received portion is received from a reception direction substantially parallel to the directional axis. The method also includes detecting the received portion of the projected pulse of light energy.

The method of the preceding paragraph can optionally include, additionally and/or alternatively, any one or more of the following features, configurations and/or additional components: calculating a super-cooled large droplet size; generating a second pulse of light energy; projecting the generated second pulse of light energy into the cloud atmosphere; receiving a portion of the projected second pulse of light energy backscattered by the cloud atmosphere; detecting the received portion of the second pulse of light energy; diverging the generated second pulse of light energy over a third solid angle, wherein the third solid angle is substantially equal to the first solid angle; circularly polarizing the second pulse of light energy; and detecting a right-hand circularly polarized portion of the second pulse of light energy.

A further embodiment of any of the foregoing methods, wherein the numerical apertures of the transmission end of the transmitter fiber and the reception end of the receiving fiber can be greater than a predetermined threshold. In some embodiments, the predetermined threshold can be 0.25, 0.3, or 0.35, for example. A further embodiment of any of the foregoing methods, wherein the second pulse of light energy is a collimated beam.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring doll d conditions compromising:
a laser diode configured to generate a pulse of light energy a transmitter fiber configured to receive the generated pulse of light energy and to protect the received pulse of light energy into a cloud atmosphere, the projected pulse of light energy projected over a field of view determined by a numerical aperture of a transmission end of the transmit fiber; a receiver fiber, separate from the transmitter fiber, having a reception end aligned proximate and substantially parallel to the transmission end of the transmitter fiber, the receiver fiber configured to receive a portion of the transmitted pulse of light energy backscattered by the cloud atmosphere; a detector configured to detect the portion of the transmitted pulse of light energy received by the receiver fiber, and a processor configured to calculate one or more metrics of the cloud atmosphere hosed on the detected portion of the pulse of light energy received and transmitted by the receiver fiber wherein a numerical aperture of the reception end of the receiver fiber is substantially equal to the numerical aperture of the transmission end of the transmitter fiber.

2. The system of claim 1, wherein the numerical apertures of the transmission end of the transmitter fiber and the reception end of the receiving fiber are greater than a predetermined threshold.

3. The system of claim 2, wherein the predetermined threshold is 0.25.

4. The system of claim 2, wherein the predetermined threshold is 0.3.

5. The system of claim 2, wherein the predetermined threshold is 0.35.

6. The system of claim 1, wherein the one or more metrics of the cloud atmosphere calculated by the processor includes a super-cooled large droplet size.

7. The system of claim 1, wherein the laser diode is a first laser diode, the pulse of light energy is a first pulse of light energy of a first wavelength, the transmitter fiber is a first transmitter fiber, the receiver fiber is a first receiver fiber, and the detector is a first detector, the cloud conditions measurement system further comprising:
a second laser diode configured to generate a second pulse of light energy of a second wavelength different from the first wavelength; and
a second detector configured to detect the portion of the second pulse of light energy backscattered by the cloud atmosphere.

8. The system of claim 7, further comprising:
a second transmitter fiber configured to receive the generated second pulse of light energy and to project the received second pulse of light energy into a cloud atmosphere, the projected second pulse of light energy projected over a field of view determined by a numerical aperture of a second transmission end of the second transmitter fiber; and
a second receiver fiber having a reception end aligned proximate and substantially parallel to the transmission end of the second transmitter fiber, the second receiver fiber configured to receive a portion of the transmitted second pulse of light energy backscattered by the cloud atmosphere;
wherein a numerical aperture of the reception end of the second receiver fiber is substantially equal to the numerical aperture of the transmission end of the second transmitter fiber.

9. The system of claim 8, further comprising:
a third receiver fiber having a reception end aligned proximate and substantially parallel to the transmission end of the second transmitter fiber, the third receiver fiber configured to receive a portion of the transmitted second pulse of light energy backscattered by the cloud atmosphere; and
a third detector configured to detect the portion of the transmitted second pulse of light energy received by the receiver fiber,
wherein a numerical aperture of the reception end of the third receiver fiber is substantially equal to the numerical aperture of the transmission end of the second transmitter fiber.

10. The system of claim 9, further comprising:
a circular polarizing element configured to circularly polarize the second pulse of light energy,
wherein the second and third detectors are configured to detect circularly polarized light energy of opposite polarization directions.

11. The system of claim 7, wherein the second pulse of light energy is collimated beam.

12. A method for measuring cloud parameters, the method comprising: generating a pulse of light energy; diverging the generated pulse of light energy over a first solid angle greater than a predetermined threshold; projecting the diverged pulse of light energy over the first solid angle into a cloud atmosphere, wherein the projected pulse is projected in a projection direction aligned with a directional axis; receiving a portion of the projected pulse of light energy backscattered by the cloud atmosphere, wherein the received portion is received over a second solid angle substantially equal to the first solid angle of the diverged pulse, and wherein the received portion is received from a reception direction substantially parallel to the directional axis; detecting the portion of the projected pulse of light energy and calculating one or more metrics of the cloud atmosphere based on the detected received portion of the protected pulse of light energy; wherein the projecting of the diverged pulse of the light energy, and the receiving of the portion of the projected pulse of light energy backscattered by the cloud atmosphere are performed by separate optical fibers.

13. The method of claim 12, wherein the predetermined threshold corresponds to a numerical aperture of 0.3.

14. The method of claim 12, wherein the predetermined threshold corresponds to a numerical aperture of 0.4.

15. The method of claim 12, wherein the predetermined threshold corresponds to a numerical aperture of 0.5.

16. The method of claim 12, wherein the calculated one or more metrics of the cloud atmosphere includes
a super-cooled large droplet size.

17. The method of claim 12, wherein the pulse of light energy is a first pulse of light energy of a first wavelength, the projection direction is a first projection direction, and the reception direction is a first reception direction, the method further comprising:
generating a second pulse of light energy; and
projecting the generated second pulse of light energy into the cloud atmosphere,
wherein the projected second pulse of light energy is projected in a second projection direction;
receiving a portion of the projected second pulse of light energy backscattered by the cloud atmosphere, wherein the received portion is received from a second reception direction substantially parallel to the second projection direction; and detecting the received portion of the second pulse of light energy.

18. The method of claim 17, further comprising:
diverging the generated second pulse of light energy over a third solid angle,
   wherein the third solid angle is substantially equal to the first solid angle.

19. The method of claim 17, wherein the second pulse of light energy is a collimated beam.

20. The method of claim 17, further comprising:
circularly polarizing the second pulse of light energy, wherein detecting the received portion of the second pulse of light energy includes detecting circularly polarized light of both right-hand and left-hand polarization directions.

* * * * *

UNITED STATES PATENT AND TRADEMARK OFFICE
CERTIFICATE OF CORRECTION

| | | |
|---|---|---|
| PATENT NO. | : 11,137,519 B2 | Page 1 of 1 |
| APPLICATION NO. | : 15/216398 | |
| DATED | : October 5, 2021 | |
| INVENTOR(S) | : Mark Ray and Kaare Josef Anderson | |

It is certified that error appears in the above-identified patent and that said Letters Patent is hereby corrected as shown below:

In the Claims

Column 13, Line 2:
Delete "A system for measuring doll d conditions compromising:"
Insert --A system for measuring cloud conditions comprising:--

Column 13, Line 6:
Delete "protect"
Insert --projected--

Column 13, Line 19:
Delete "hosed"
Insert --based--

Signed and Sealed this
Sixth Day of February, 2024

*Katherine Kelly Vidal*

Katherine Kelly Vidal
*Director of the United States Patent and Trademark Office*